United States Patent
Herbert et al.

(10) Patent No.: US 6,531,048 B1
(45) Date of Patent: Mar. 11, 2003

(54) ELECTROCHEMICAL PROCESS TO SEVER METAL FIBERS

(75) Inventors: William G. Herbert, Williamson, NY (US); Catherine N. Byers, Sterling, NY (US); Gary J. Maier, Webster, NY (US); Jennifer Hwang, Penfield, NY (US); Garry O. Glanzel, Wolcott, NY (US)

(73) Assignee: Xerox Corporation, Stamford, CT (US)

( * ) Notice: Subject to any disclaimer, the term of this patent is extended or adjusted under 35 U.S.C. 154(b) by 4 days.

(21) Appl. No.: 09/918,782

(22) Filed: Jul. 31, 2001

(51) Int. Cl.⁷ .................................................. C25F 5/00
(52) U.S. Cl. ...................... 205/704; 205/717; 205/741; 205/640
(58) Field of Search ................................ 205/704, 717, 205/741, 640

(56) References Cited

U.S. PATENT DOCUMENTS 4,161,434 A * 7/1979 Quinlan et al. ............. 205/717
5,997,722 A 12/1999 Vidal et al. .................. 205/711
6,048,657 A 4/2000 Herbert et al. .............. 430/127

OTHER PUBLICATIONS

William G. Herbert et al., "Process to Sever Metal Fibers Using Galvanic Cell", Ser. No. 09/969,461, Filed Oct. 1, 2001 (D/99681Q).

* cited by examiner

Primary Examiner—Arun S. Phasge
(74) Attorney, Agent, or Firm—Zosan S. Soong

(57) ABSTRACT

A process including: (a) creating an electrolytic cell composed of a metal surface as a first electrode, a second electrode, and an electrolytic solution, wherein the metal surface has a plurality of metal fibers connected to the metal surface; and (b) treating electrochemically the metal surface with externally supplied power to the electrolytic cell to sever a number of the metal fibers from the metal surface to result in severed metal fiber fragments unconnected with the metal surface.

17 Claims, No Drawings

ELECTROCHEMICAL PROCESS TO SEVER METAL FIBERS

BACKGROUND OF THE INVENTION

Substrates for industrial applications frequently are required to have exacting dimensional tolerances, and in some situations also are required to have non-reflective surfaces. The exacting dimensional tolerances can be obtained via lathing or grinding. Of the two methods, grinding provides the more exacting dimensional tolerances. The lathed surface may be roughened via, for example, honing, when a non-reflective surface is required or, in some cases, rough lathed. Lathing and grinding, however, may produce metal fibers connected to the surface of the substrates (with grinding producing more metal fibers than lathing). If not removed, these metal fibers may cause problems since they can affect the performance of devices incorporating the substrates. For photoreceptors, metal fibers attached to the substrate surface may not allow the formation of sufficient charge in the areas located above the metal fibers. Xerographic prints made using such a photoreceptor substrate (containing the attached fit metal fibers) may have a deletion or a dark spot in the areas associated with the metal fibers. Applicants tolerated the presence of the metal fibers and adjusted the lathing parameters to keep the number of metal fibers produced low. However, it is desirable to remove the metal fibers for a number of reasons. Thus, there is a need which the present invention addresses for a process that can quickly remove metal fibers from substrates.

Conventional electrochemical surface treatments are illustrated in Herbert et al., U.S. Pat. No. 6,048,657; and Vidal et al., U.S. Pat. No. 5,997,722.

SUMMARY OF THE INVENTION

The present invention is accomplished in embodiments by providing a process comprising:

(a) creating an electrolytic cell comprised of a metal surface as a first electrode, a second electrode, and an electrolytic solution, wherein the metal surface has a plurality of metal fibers connected to the metal surface; and (b) treating electrochemically the metal surface with externally supplied power to the electrolytic cell to sever a number of the metal fibers from the metal surface to result in severed metal fiber fragments unconnected with the metal surface.

DETAILED DESCRIPTION

The present invention involves creating an electrolytic cell composed of the metal surface having attached metal fibers as a first electrode, a second electrode, and an electrolytic solution. In the electrolytic cell, the working electrode is the metal surface having the metal fibers. The counterelectrode (i.e., second electrode) may be for example concentric, surrounding the metal surface. The counterelectrode or electrodes may be: a noble metal such as gold, silver, platinum, palladium; an inert material such as graphite; or a strongly passive material such as titanium, lead, tantalum, or alloys thereof.

The metal surface is part of a substrate. The substrate can be formulated entirely of an electrically conductive material, or it can be an insulating material having an electrically conductive surface. The entire substrate can comprise the same material as that in the electrically conductive surface or the electrically conductive surface can merely be a coating on the substrate. Any suitable electrically conductive material can be employed. Typical electrically conductive materials include copper, brass, nickel, zinc, chromium, stainless steel, aluminum, semitransparent aluminum, steel, cadmium, titanium, silver, gold, indium, tin, metal oxides including tin oxide and indium tin oxide, and the like. In embodiments, the metal fibers and metal surface are a metal selected from stainless steel, aluminum, and an aluminum alloy. The substrate can be flexible or rigid, and can have any number of configurations such as a cylindrical drum, an endless flexible belt, and the like. The substrate may be used for a number of industrial purposes including for example in photoreceptors, donor rolls, fuser rolls, contact charge rolls, or in any roll (or part, for that matter) that has to interface with a photoreceptor or other device that is charged or partly charged. This is especially the case if the device is coated with a thin layer of a material that has to have uniform electrical properties. One can see how the presence of metal fibers on the substrate would cause the same or similar problem in all of above situations.

The metal fibers typically have the same composition as the metal surface. Following is a description of the metal fibers prior to the present process. The metal fibers may have a length ranging for example from about 20 to about 500 micrometers and a thickness ranging from about 2 to about 15 micrometers. The number of metal fibers may vary depending upon the metal surface and the process causing the formation of the metal fibers. For example, the metal fibers may be present in a concentration ranging from about 0.03 to about 10 metal fibers per square centimeter of metal surface produced via a grinding process, and from 0 to about 1 metal fiber per square centimeter produced via a lathing process. The metal fibers may be straight, slightly curved, or severely bent with the tip pointing in the direction of the metal surface.

The electrolytic solution includes water, an electrolyte, and optionally one or more diffusion layer thickening agents. The electrolyte can be any of many salts or weak acids (or well-buffered strong acids). The function of the electrolyte is to make the solution (electrolyte) sufficiently conductive to allow the passage of small currents on the order of for example a few mill-amps. NaCl in concentrations of from about 1 g/L to about 10 g/L can be used, as well as the same concentrations of KCl. Sulfamic acid at concentrations of from about 0.01 to about 0.1 g/L that was buffered with about 35 g/L Boric Acid can be also used. Boric Acid and Phosphoric Acid can be used without any buffer at concentrations of from about 0.1 to about 1.0 g/L.

Suitable diffusion layer thickening agents include for example Glycerin ($CH_2OHCH(OH)COOH$) from about 500 ml/L to about 900 ml/L, Polyethylene Glycol 200 ($H(OCH_2CH_2)_4OH$) (PEG-200) from about 350 ml/L to about 800 ml/L, and Polyethylene Glycol 400 ($H(OCH_2CH_2)_{8.2-9.1}OH$) (PEG-400) from about 200 ml/L to about 675 ml/L. Other diffusion layer thickening agents include for example sugar (cane or beet) and honey (clover or orange blossom). The diffusion layer thickening agent may be partially or fully soluble in water, especially being miscible with water. In embodiments, the diffusion layer thickening agent may have a density at least greater than one, may cause the viscosity of the electrolytic solution to increase when added, and/or may be, for the most part, non-conductive.

The function of the diffusion layer thickening agent is now discussed. As is known, the diffusion layer is the region near an electrode where the concentration of an ionic or molecular species differs from its bulk concentration. As the boundary between the diffusion layer and the unaltered bulk solution is not sharp, it has been defined arbitrarily as that region where the concentration of a particular species differs from its bulk concentration by more than 1%. The diffusion layer thickening agent retards the mobility of ions in the diffusion layer, thereby slowing down the rate of reaction. In the prior art, a diffusion layer thickening agent has been added to electropolishing solutions in a concentration that retards the action of the electrolytic polishing processes near the low areas of the surface of the material being polished (the low areas are low in respect to the overall surface of the substrate and may be about 0.01 to about 0.50 micrometer from the high areas). This helps insure that little or no reactions are occuring in the low areas. By restricting the rate of reaction in the low areas one is protected from pitting and from the uniform removal of material, and this facilitates the reactions at the high areas. Thus, material is removed from the high areas (in this case greater than 0.01 micrometer from the low areas of the surface) and a smoother more reflective surface is produced.

In certain embodiments of the present invention, the diffusion layer thickening agent may be present in a lower concentration ("Increase Reflectivity Concentration") that creates a smoother more reflective surface. In other embodiments of the present invention, the diffusion layer thickening agent is present in a higher concentration ("Maintain Reflectivity Concentration") such that the reflectivity of the metal surface remains substantially unchanged by the instant process. The phrases "lower concentration" and "higher concentration" are relative to use of the same diffusion layer thickening agent. Trial and error may be used to determine the amount of the diffusion layer thickening agent needed to achieve the desired effect.

In embodiments of the present invention, there is absent any polishing of the surface (polishing results in a reflective surface which can cause the plywood print defect to occur). Thus, it may be desirable in certain embodiments to make the diffusion layer thicker (by adding excess diffusion layer thickening agent at the Maintain Reflectivity Concentration, and optionally keeping the bath temperature low) so that reactions are promoted at distances greater than 0.01 micrometers from the low areas of the surface. Indeed, in certain embodiments, it appears as if the reactions can occur at from about 0.75 to about 1.5 micrometers from the low areas of the surface.

Surface roughness is measured in micrometers and is expressed as either the arithmetical mean deviation (Ra or AA) or the root-mean-square deviation (Rq or RMS). A full explanation of these measurements can be found in DIN 4762, DIN 4768, and ISO 4287/1. In embodiments, the surface roughness of the substrate before treatment may be from about 0.140 to about 0.450 micrometers Ra and the surface roughness of the substrate after treatment may be the same. In embodiments, a surface roughness of less than about 0.140 Ra may cause the plywood print defect. These measurements can be done on a Perthometer S8P using a 2 micrometer stylus operating perpendicular to the grinding or lathing pattern (lines). DIN 4762 and/or ISO 4287/1 describe additional operating parameters (e.g., cut off, sample length, and stylus speed).

While one could measure reflectivity (such as by measuring Automatic Density Control), it is also possible to use Ra as a surrogate for reflectivity.

While substrate surface characteristics such as surface roughness, reflectivity, and pitting may be of concern in certain embodiments, in other embodiments, such surface characteristics are of lesser concern or of no concern where severing of the metal fibers from the metal surface is the main goal or only goal.

In those embodiments involving an electro-polishing system, one is often forced to make adjustments in the operating conditions as one proceeds. For example, if the desired level of reflectivity (note that this determination may be made by comparing, by eye, the substrate's surface to a standard or by just looking at the surface) is not achieved, one first determines if the diffusion layer is too thick (for example, no polishing is occurring) or too thin (for example, pitting is seen). If the diffusion layer is too thin, one adds more diffusion layer thickening agent (makes the diffusion layer thicker) and/or reduces the temperature (slows down ionic migration). If the diffusion layer is too thick, one increases the temperature (speeds up the ionic migration) and/or dilutes the bath (reduces the diffusion layer thickness). Determining the adjustments to be made may be done on a trial and error basis; this is due to the variability in the raw material. Even when electro-polishing the same alloy of aluminum or stainless steel from the same vendor, there may be sufficient variability to cause one to change the operating parameters of the electro-polishing system. The concentrations of the diffusion layer thickening agent used in embodiments of the electro-polishing systems may be for example from about 100 to about 600 ml/L of Glycerin, from about 250 ml/L to about 700 ml/L Phosphoric Acid, and from about 60 ml/L to about 80 ml/L Diethyleneglycol-monobutylether (DEGMBE). The Polyethylene Glycol 200 and 400 may be used in concentrations from about less than about 200 ml/L and about 100 ml/L respectively. In certain embodiments, the Phosphoric Acid can act as both the electrolyte and the diffusion layer thickening agent.

The following TABLE 1 sets forth illustrative values for certain parameters of the present process in increasing reflectivity of the substrate versus maintaining reflectivity of the substrate.

TABLE 1

| Process Parameter | Increase Reflectivity | | Maintain Reflectivity | | |
| --- | --- | --- | --- | --- | --- |
| | Aluminum Substrate | Stainless Substrate | Aluminum Substrate | Stainless Substrate | Difference |
| Thickening Agents: ml/L | | | | | |
| Glycerin (broader range) | 100–200 | 500–600 | 500–900 | 500–900 | Up to 9 times |
| Glycerin (narrower range) | 125–150 | 520–550 | 850–875 | 850–875 | 1.5 to 1 Times |
| PEG-200 (broader range) | 100–200 | — | 350–800 | 350–800 | 1.75 to 8 Times |

TABLE 1-continued

| | Increase Reflectivity | | Maintain Reflectivity | | |
|---|---|---|---|---|---|
| Process Parameter | Aluminum Substrate | Stainless Substrate | Aluminum Substrate | Stainless Substrate | Difference |
| PEG-200 (narrower range) | 125–150 | | 500–750 | 500–750 | 3.3 to 6 Times |
| PEG-400 (broader range) | 70–100 | — | 200–600 | 200–600 | 2 to 8.6 Times |
| PEG-400 (narrower range) | 80–90 | | 400–550 | 400–550 | 4.4 to 6.9 Times |
| DEGMBE | — | 60–80 | — | — | |
| Phosphoric Acid | 400–750 | 400–630 | — | — | |
| Glycalic Acid | — | 200–800 | — | — | |
| Current Density amps/dm$^2$ | 10–150 | 186–9290 | 0.001–0.008 | 0.001–0.008 | >10$^5$ Times |
| narrower range | 30–70 | 929–2787 | 0.006 | 0.006 | >10$^5$ Times |
| Temperature ° C. | 30–100 | 27–102 | 18–35 | 18–35 | Up to 84 degrees C. |
| narrower range | 70–90 | 60–90 | 20–23 | 20–23 | 3 to 4.5 Times |
| Time Minutes | 2–15 | 2–15 | 0.08–0.75 | 0.08–0.75 | 1.25 to 14 min. |
| narrower range | 3–5 | 3–5 | 0.3–0.5 | 0.3–0.5 | 10 Times |

After creating the electrolytic cell, the present process then treats electrochemically the metal surface with externally supplied power to the electrolytic cell to sever a number of the metal fibers, at a point ranging for example from the metal surface to about halfway up the length of the metal fibers, from the metal surface. The term "sever" indicates loss of physical connection of the severed metal fiber fragment to the metal surface where the instant process achieves severing without entirely consuming or disintegrating each metal fiber. The resulting severed metal fiber fragment has a length ranging for example from about 20 to about 500 micrometers. The severed metal fiber fragments can be found in the electrolytic solution or at the bottom of the vessel. Each of the severed metal fiber fragments leaves behind on the metal surface a remaining metal fiber length ranging for instance from 0 to about 5 micrometers, particularly from 0 to about 2 micrometers, that is connected to the metal surface. In embodiments, the remaining metal fiber length and/or severed metal fiber fragments may undergo some dissolution during the present process. It is not fully understood how the present process severs the metal fibers. Perhaps the present process involves burning, dissolution, or a combination thereof. In embodiments, the present process involves treating electrochemically the metal surface with externally supplied power for a time period ranging for example from about 0.25 minute to about 5 minutes, and particularly from about 0.5 minute to about 3 minutes. At atmospheric pressure, the electrolytic solution temperature is approximately 25° C. However, the present process may be conducted at any suitable temperature including for example from about 18 to about 35° C., particularly from about 20 to about 23° C.

Advantages of the present invention include one or more of the following: A surface significantly free of the metal fibers (that may cause black spots or deletions in the case of a photoreceptor); a surface that will not cause the plywood print defect in the case of a photoreceptor; a process that is fast; a process that is relatively inexpensive; and a process that does not use chemicals that are harmful to the operators or the environment.

The invention will now be described in detail with respect to specific preferred embodiments thereof, it being understood that these examples are intended to be be illustrative only and the invention is not intended to be limited to the materials, conditions, or process parameters recited herein. All percentages and parts are by weight unless otherwise indicated.

EXAMPLES AND COMPARATIVE EXAMPLES

Sample preparation and testing were similarly performed in the examples and comparative examples except as otherwise noted. The operating parameters are described in the examples and comparative examples. Freshly ground 304 stainless steel or 6063 alloy aluminum photoreceptor substrates (340 mm long with 30 mm outside diameter) were inspected for metal fibers using 50× magnification. If more than 20 fibers were found on the substrates and were substantially uniform in their distribution, especially on one end versus the other, the substrates were washed using a gentle flow of acetone. After washing, the substrates were marked with indelible ink on their inside surface at their upper end. Next, the surface roughness (Ra) was measured using a 2 micron stylus run perpendicular to the grinding marks on a Perthometer S8P. Ra was measured 8 times around each sample's circumference 20 mm from each end of the substrate. After recording the identifying mark and the average Ra obtained at each end, each sample was stored in a clean covered box until it was subsequently treated.

One half of each sample was then subjected to the electrolytic treatment by submerging the sample half way into the electrolytic solution. The samples were held at their tops with a titanium spring that fit snugly into their inside diameter during the electrolytic treatment. The samples were made to be anodic compared to the counter (2nd) titanium electrode. After the electrolytic treatment, the samples were gently rinsed with 9 million ohm deionized water and then allowed to air dry. Subsequent to this, Ra was again measured (8 times at both ends as before) and recorded. The samples were processed through a photoreceptor coating process where they were coated over their entire length with an undercoat layer, a charge generating layer, and a charge transport layer.

After coating, the samples were print tested in a Xerox printer/copier machine that produces black spots when there is a problem maintaining an appropriate charge in the photoconductor system. The change in Ra (if any) and the print test results (top versus bottom of each sample) were evaluated and recorded. In the examples and comparative examples, the substrate top half (which received no electrolytic treatment) exhibited the following characteristics: no plywood defect phenomenon; at least 10 black spots; and no pits. In the examples, the absence of black spots indicated that the present process succeeded in severing the metal fibers from the metal surface. In contrast, the presence of black spots in the comparative examples indicated failure to sever metal fibers from the metal surface under certain conditions.

Example 1

| Run Number | Operating Parameters: Glycerin ml/L | Temp ° C. | Current Density Amps/dm | Time Min. | Results: Delta Ra Micron | Black Spots | Pits | Plywood Defect |
|---|---|---|---|---|---|---|---|---|
| 1 | 400 | 30 | 2 | 0.5 | 0.002 | No | No | No |
| 2 | 400 | 60 | 20 | 1 | 0.047 | No | No | Yes |
| 3 | 400 | 90 | 275 | 2 | 0.112 | No | Yes | Yes |
| 4 | 500 | 30 | 20 | 2 | 0.006 | No | No | No |
| 5 | 500 | 60 | 275 | 0.5 | 0.053 | No | Yes | Yes |
| 6 | 500 | 90 | 2 | 1 | 0.033 | No | Yes | No |
| 7 | 600 | 30 | 275 | 1 | 0.008 | No | No | No |
| 8 | 600 | 60 | 2 | 2 | 0.014 | No | No | No |
| 9 | 600 | 90 | 20 | 0.5 | 0.024 | No | No | No |
| 10 | 600 | 90 | 275 | 2 | 0.213 | No | No | Yes |

Notes:
1. Aluminum substrates were used in all runs.
2. 300 ml/L $H_3PO_4$ was used in all runs.
3. Loss of about 0.040 micron in Ra gave Plywood print defect.
4. Run 10 is run at the Polishing Parameters except time is 2 min. versus 5 min.

Example 2

| Run No. | Operating Parameters: Glycerin ml/L | Temp ° C. | Current Density Amps/dm | Time Min. | Results: Delta Ra Micron | Black Spots | Pits | Plywood Defect |
|---|---|---|---|---|---|---|---|---|
| 1 | 400 | 30 | 2 | 0.5 | 0.000 | No | No | No |
| 2 | 400 | 60 | 20 | 1 | 0.033 | No | No | No |
| 3 | 400 | 90 | 275 | 2 | 0.096 | No | Yes | Yes |
| 4 | 500 | 30 | 20 | 2 | 0.001 | No | No | No |
| 5 | 500 | 60 | 275 | 0.5 | 0.045 | No | Yes | Yes |
| 6 | 500 | 90 | 2 | 1 | 0.027 | No | Yes | No |
| 7 | 600 | 30 | 275 | 1 | 0.004 | No | No | No |
| 8 | 600 | 60 | 2 | 2 | 0.009 | No | No | No |
| 9 | 600 | 90 | 20 | 0.5 | 0.018 | No | No | No |
| 10 | 600 | 90 | 275 | 2 | 0.196 | No | No | Yes |

Notes:
1. Stainless steel substrates were used in all runs.
2. 300 ml/L $H_3PO_4$ was used in all runs.
3. Loss of about 0.040 micron in Ra gave Plywood print defect.
4. Run 10 is run at the Polishing Parameters except time is 2 min. versus 8 min.

Example 3

| Run No. | Operating Parameters: Glycerin ml/L | Temp ° C. | Current Density Amps/dm | Time Min. | NaCl g/L | Results: Delta Ra Micron | Black Spots | Pits | Plywood Defect |
|---|---|---|---|---|---|---|---|---|---|
| Comp. Ex. 3-1 | 400 | 23 | 0.001 | 0.25 | 1 | 0.000 | Yes | No | No |
| 1 | 400 | 23 | 0.001 | 2.50 | 1 | 0.007 | No | Yes | No |
| Comp. Ex. 3-2 | 400 | 23 | 0.004 | 0.50 | 5 | 0.000 | Yes | No | No |
| 2 | 400 | 23 | 0.004 | 2.50 | 5 | 0.028 | No | Yes | No |

-continued

| | Operating Parameters: | | | | | Results: | | | |
|---|---|---|---|---|---|---|---|---|---|
| Run No. | Glycerin ml/L | Temp ° C. | Current Density Amps/dm | Time Min. | NaCl g/L | Delta Ra Micron | Black Spots | Pits | Plywood Defect |
| 3 | 400 | 23 | 0.008 | 1.00 | 10 | 0.004 | No | Yes | No |
| 4 | 700 | 23 | 0.004 | 1.00 | 1 | 0.000 | No | No | No |
| 5 | 700 | 23 | 0.008 | 0.25 | 5 | 0.000 | No | No | No |
| 6 | 700 | 23 | 0.001 | 0.50 | 10 | 0.003 | No | Yes | No |
| 7 | 900 | 23 | 0.008 | 0.50 | 1 | 0.000 | No | No | No |
| 8 | 900 | 23 | 0.001 | 1.00 | 5 | 0.000 | No | No | No |
| 9 | 900 | 23 | 0.004 | 0.25 | 10 | 0.000 | No | No | No |
| 10 | 850 | 23 | 0.004 | 0.50 | 0.5 | 0.000 | No | No | No |
| 11 | 850 | 15 | 0.004 | 0.50 | 0.5 | 0.000 | No | No | No |
| 12 | 850 | 40 | 0.004 | 0.50 | 0.5 | 0.011 | No | Yes | No |
| 13 | 650 | 23 | 0.004 | 0.50 | 1 | 0.000 | No | No | No |
| 14 | 500 | 23 | 0.004 | 0.50 | 1 | 0.000 | No | No | No |
| Comp. Ex. 3-3 | 450 | 23 | 0.004 | 0.50 | 1 | 0.003 | Yes | Yes | No |
| 15 | 450 | 23 | 0.004 | 2.50 | 1 | 0.019 | No | Yes | No |
| 16 | 800 | 23 | 0.004 | 0.50 | 1 | 0.000 | No | No | No |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.003 | No | Yes | No |

Notes:
1. Aluminum substrates were used in all runs.
2. NaCl concentration between about 0.5 and about 1 g/L.
3. Glycerin concentration above about 800 ml/L.

Example 4

| | Operating Parameters: | | | | | Results: | | | |
|---|---|---|---|---|---|---|---|---|---|
| Run No. | Glycerin ml/L | Temp ° C. | Current Density Amps/dm | Time Min. | NaCl g/L | Delta Ra Micron | Black Spots | Pits | Plywood Defect |
| Comp. Ex. 4-1 | 400 | 23 | 0.001 | 0.25 | 1 | 0.000 | Yes | No | No |
| 1 | 400 | 23 | 0.001 | 2.50 | 1 | 0.009 | No | Yes | No |
| Comp. Ex. 4-2 | 400 | 23 | 0.004 | 0.50 | 5 | 0.000 | Yes | No | No |
| 2 | 400 | 23 | 0.004 | 2.50 | 5 | 0.027 | No | Yes | No |
| 3 | 400 | 23 | 0.008 | 1.00 | 10 | 0.002 | No | No | No |
| 4 | 700 | 23 | 0.004 | 1.00 | 1 | 0.000 | No | No | No |
| 5 | 700 | 23 | 0.008 | 0.25 | 5 | 0.000 | No | No | No |
| 6 | 700 | 23 | 0.001 | 0.50 | 10 | 0.001 | No | No | No |
| 7 | 900 | 23 | 0.008 | 0.50 | 1 | 0.000 | No | No | No |
| 8 | 900 | 23 | 0.001 | 1.00 | 5 | 0.000 | No | No | No |
| 9 | 900 | 23 | 0.004 | 0.25 | 10 | 0.000 | No | No | No |
| 10 | 850 | 23 | 0.004 | 0.50 | 0.5 | 0.000 | No | No | No |
| 11 | 850 | 15 | 0.004 | 0.50 | 0.5 | 0.000 | No | No | No |
| 12 | 850 | 40 | 0.004 | 0.50 | 0.5 | 0.008 | No | Yes | No |
| 13 | 650 | 23 | 0.004 | 0.50 | 1 | 0.000 | No | No | No |
| 14 | 500 | 23 | 0.004 | 0.50 | 1 | 0.000 | No | No | No |
| Comp. Ex. 4-3 | 450 | 23 | 0.004 | 0.50 | 1 | 0.001 | Yes | Yes | No |
| 15 | 450 | 23 | 0.004 | 2.50 | 1 | 0.018 | No | Yes | No |
| 16 | 800 | 23 | 0.004 | 0.50 | 1 | 0.000 | No | No | No |

-continued

| Run No. | Operating Parameters: | | | | | Results: | | | |
| --- | --- | --- | --- | --- | --- | --- | --- | --- | --- |
| | Glycerin ml/L | Temp °C. | Current Density Amps/dm | Time Min. | NaCl g/L | Delta Ra Micron | Black Spots | Pits | Plywood Defect |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.001 | No | Yes | No |

Notes:
1. Stainless steel substrates were used in all runs.
2. NaCl concentration between about 0.5 and about 1 g/L.
3. Glycerin concentration above about 800 ml/L.

Example 5

| Run No. | Operating Parameters: | | | | | Results: | | | |
| --- | --- | --- | --- | --- | --- | --- | --- | --- | --- |
| | Glycerin ml/L | Temp °C. | Current Density Amps/dm | Time Min. | KCl g/L | Delta Ra Micron | Black Spots | Pits | Plywood Defect |
| Comp. Ex. 5-1 | 400 | 23 | 0.001 | 0.25 | 1 | 0.000 | Yes | No | No |
| 1 | 400 | 23 | 0.001 | 2.50 | 1 | 0.008 | No | Yes | No |
| Comp. Ex. 5-2 | 400 | 23 | 0.004 | 0.50 | 5 | 0.000 | Yes | No | No |
| 2 | 400 | 23 | 0.004 | 2.50 | 5 | 0.030 | No | Yes | No |
| 3 | 400 | 23 | 0.008 | 1.00 | 10 | 0.004 | No | Yes | No |
| 4 | 700 | 23 | 0.004 | 1.00 | 1 | 0.000 | No | No | No |
| 5 | 700 | 23 | 0.008 | 0.25 | 5 | 0.000 | No | No | No |
| 6 | 700 | 23 | 0.001 | 0.50 | 10 | 0.003 | No | Yes | No |
| 7 | 900 | 23 | 0.008 | 0.50 | 1 | 0.000 | No | No | No |
| 8 | 900 | 23 | 0.001 | 1.00 | 5 | 0.000 | No | No | No |
| 9 | 900 | 23 | 0.004 | 0.25 | 10 | 0.000 | No | No | No |
| 10 | 850 | 23 | 0.004 | 0.50 | 0.5 | 0.000 | No | No | No |
| 11 | 850 | 15 | 0.004 | 0.50 | 0.5 | 0.000 | No | No | No |
| 12 | 850 | 40 | 0.004 | 0.50 | 0.5 | 0.011 | No | Yes | No |
| 13 | 650 | 23 | 0.004 | 0.50 | 1 | 0.000 | No | No | No |
| 14 | 500 | 23 | 0.004 | 0.50 | 1 | 0.000 | No | No | No |
| Comp. Ex. 5-3 | 450 | 23 | 0.004 | 0.50 | 1 | 0.003 | Yes | Yes | No |
| 15 | 450 | 23 | 0.004 | 2.50 | 1 | 0.021 | No | Yes | No |
| 16 | 800 | 23 | 0.004 | 0.50 | 1 | 0.000 | No | No | No |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.003 | No | Yes | No |

Notes:
1. Aluminum substrates were used in all runs.
2. KCl concentration between about 0.5 and about 1 g/L.
3. Glycerin concentration above about 800 ml/L.

Example 6

| Run No. | Glycerin ml/L | Temp °C. | Current Density Amps/dm | Time Min. | KCl g/L | Delta Ra Micron | Black Spots | Pits | Plywood Defect |
|---|---|---|---|---|---|---|---|---|---|
| Comp. Ex. 6-1 | 400 | 23 | 0.001 | 0.25 | 1 | 0.000 | Yes | No | No |
| 1 | 400 | 23 | 0.001 | 2.50 | 1 | 0.006 | No | Yes | No |
| Comp. Ex. 6-2 | 400 | 23 | 0.004 | 0.50 | 5 | 0.000 | Yes | No | No |
| 2 | 400 | 23 | 0.004 | 2.50 | 5 | 0.022 | No | Yes | No |
| 3 | 400 | 23 | 0.008 | 1.00 | 10 | 0.002 | No | No | No |
| 4 | 700 | 23 | 0.004 | 1.00 | 1 | 0.000 | No | No | No |
| 5 | 700 | 23 | 0.008 | 0.25 | 5 | 0.000 | No | No | No |
| 6 | 700 | 23 | 0.001 | 0.50 | 10 | 0.001 | No | No | No |
| 7 | 900 | 23 | 0.008 | 0.50 | 1 | 0.000 | No | No | No |
| 8 | 900 | 23 | 0.001 | 1.00 | 5 | 0.000 | No | No | No |
| 9 | 900 | 23 | 0.004 | 0.25 | 10 | 0.000 | No | No | No |
| 10 | 850 | 23 | 0.004 | 0.50 | 0.5 | 0.000 | No | No | No |
| 11 | 850 | 15 | 0.004 | 0.50 | 0.5 | 0.000 | No | No | No |
| 12 | 850 | 40 | 0.004 | 0.50 | 0.5 | 0.008 | No | Yes | No |
| 13 | 650 | 23 | 0.004 | 0.50 | 1 | 0.000 | No | No | No |
| 14 | 500 | 23 | 0.004 | 0.50 | 1 | 0.000 | No | No | No |
| Comp. Ex. 6-3 | 450 | 23 | 0.004 | 0.50 | 1 | 0.001 | Yes | Yes | No |
| 15 | 450 | 23 | 0.004 | 2.50 | 1 | 0.016 | No | Yes | No |
| 16 | 800 | 23 | 0.004 | 0.50 | 1 | 0.000 | No | No | No |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.001 | No | Yes | No |

Notes:
1. Stainless steel substrates were used in all runs.
2. KCl concentration between about 0.5 and about 1 g/L.
3. Glycerin concentration above about 800 ml/L.

Example 7

| Run No. | PEG-200 ml/L | Temp °C. | Current Density Amps/dm | Time Min. | NaCl g/L | Delta Ra Micron | Black Spots | Pits | Plywood Defect |
|---|---|---|---|---|---|---|---|---|---|
| Comp. Ex. 7-1 | 200 | 23 | 0.001 | 0.25 | 1 | 0.000 | Yes | No | No |
| 1 | 200 | 23 | 0.001 | 2.50 | 1 | 0.011 | No | Yes | No |
| Comp. Ex. 7-2 | 200 | 23 | 0.004 | 0.50 | 5 | 0.000 | Yes | No | No |
| 2 | 200 | 23 | 0.004 | 2.50 | 5 | 0.035 | No | Yes | No |
| 3 | 200 | 23 | 0.008 | 1.00 | 10 | 0.004 | No | Yes | No |
| 4 | 500 | 23 | 0.004 | 1.00 | 1 | 0.000 | No | No | No |
| 5 | 500 | 23 | 0.008 | 0.25 | 5 | 0.000 | No | No | No |
| 6 | 500 | 23 | 0.001 | 0.50 | 10 | 0.003 | No | No | No |
| 7 | 800 | 23 | 0.008 | 0.50 | 1 | 0.000 | No | No | No |
| 8 | 800 | 23 | 0.001 | 1.00 | 5 | 0.000 | No | No | No |
| 9 | 800 | 23 | 0.004 | 0.25 | 10 | 0.000 | No | No | No |
| 10 | 600 | 23 | 0.004 | 0.50 | 0.5 | 0.000 | No | No | No |
| 11 | 600 | 15 | 0.004 | 0.50 | 0.5 | 0.000 | No | No | No |
| 12 | 600 | 40 | 0.004 | 0.50 | 0.5 | 0.011 | No | Yes | No |

-continued

| | Operating Parameters: | | | | | Results: | | | |
|---|---|---|---|---|---|---|---|---|---|
| Run No. | PEG-200 ml/L | Temp °C. | Current Density Amps/dm | Time Min. | NaCl g/L | Delta Ra Micron | Black Spots | Pits | Plywood Defect |
| Comp. Ex. 7-3 | 250 | 23 | 0.004 | 0.50 | 10 | 0.000 | Yes | Yes | No |
| 13 | 250 | 23 | 0.004 | 2.50 | 10 | 0.026 | No | Yes | No |
| Comp. Ex. 7-4 | 300 | 23 | 0.004 | 0.50 | 10 | 0.000 | Yes | Yes | No |
| 14 | 300 | 23 | 0.004 | 2.50 | 10 | 0.022 | No | Yes | No |
| 15 | 325 | 23 | 0.004 | 0.50 | 10 | 0.000 | No | No | No |
| 16 | 350 | 23 | 0.004 | 0.50 | 10 | 0.000 | No | No | No |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.003 | No | Yes | No |

Notes:
1. Aluminum substrates were used in all runs.
2. NaCl concentration between about 0.5 and about 1 g/L.
3. PEG-200 concentration above about 325 ml/L.

Example 8

| | Operating Parameters: | | | | | Results: | | | |
|---|---|---|---|---|---|---|---|---|---|
| Run No. | PEG-400 ml/L | Temp °C. | Current Density Amps/dm | Time Min. | NaCl g/L | Delta Ra Micron | Black Spots | Pits | Plywood Defect |
| Comp. Ex. 8-1 | 200 | 23 | 0.001 | 0.25 | 1 | 0.000 | Yes | No | No |
| 1 | 200 | 23 | 0.001 | 2.50 | 1 | 0.005 | No | Yes | No |
| Comp. Ex. 8-2 | 200 | 23 | 0.004 | 0.50 | 5 | 0.000 | Yes | No | No |
| 2 | 200 | 23 | 0.004 | 2.50 | 5 | 0.012 | No | Yes | No |
| 3 | 200 | 23 | 0.008 | 1.00 | 10 | 0.004 | No | Yes | No |
| 4 | 500 | 23 | 0.004 | 1.00 | 1 | 0.000 | No | No | No |
| 5 | 500 | 23 | 0.008 | 0.25 | 5 | 0.000 | No | No | No |
| 6 | 500 | 23 | 0.001 | 0.50 | 10 | 0.003 | No | No | No |
| 7 | 800 | 23 | 0.008 | 0.50 | 1 | 0.000 | No | No | No |
| 8 | 800 | 23 | 0.001 | 1.00 | 5 | 0.000 | No | No | No |
| 9 | 800 | 23 | 0.004 | 0.25 | 10 | 0.000 | No | No | No |
| 10 | 600 | 23 | 0.004 | 0.50 | 0.5 | 0.000 | No | No | No |
| 11 | 600 | 15 | 0.004 | 0.50 | 0.5 | 0.000 | No | No | No |
| 12 | 600 | 40 | 0.004 | 0.50 | 0.5 | 0.011 | No | Yes | No |
| 13 | 250 | 23 | 0.004 | 0.50 | 10 | 0.000 | No | No | No |
| 14 | 300 | 23 | 0.004 | 0.50 | 10 | 0.000 | No | No | No |
| 15 | 325 | 23 | 0.004 | 0.50 | 10 | 0.000 | No | No | No |
| 16 | 350 | 23 | 0.004 | 0.50 | 10 | 0.000 | No | No | No |
| 17 | 800 | 25 | 0.004 | 0.50 | 1 | 0.000 | No | No | No |
| 18 | 800 | 28 | 0.004 | 0.50 | 1 | 0.000 | No | No | No |
| 19 | 800 | 33 | 0.004 | 0.50 | 1 | 0.003 | No | No | No |
| 20 | 800 | 36 | 0.004 | 0.50 | 1 | 0.003 | No | Yes | No |

Notes:
1. Aluminum substrates were used in all runs.
2. NaCl concentration between about 0.5 and about 1 g/L.
3. PEG-400 concentration above about 250 ml/L.

Other modifications of the present invention may occur to those skilled in the art based upon a reading of the present disclosure and these modifications are intended to be included within the scope of the present invention.

We claim:

1. A process comprising:
   (a) creating an electrolytic cell comprised of a metal surface as a first electrode, a second electrode, and an electrolytic solution including a diffusion layer thickening agent, wherein the metal surface has a plurality of metal fibers connected to the metal surface; and
   (b) treating electrochemically the metal surface with externally supplied power to the electrolytic cell to sever a number of the metal fibers from the metal surface to result in severed metal fiber fragments unconnected with the metal surface.

2. The process of claim 1, wherein the metal fibers are severed from the metal surface at a point ranging from the metal surface to about halfway up the length of the metal fibers.

3. The process of claim 1, wherein the diffusion layer thickening agent is present in a concentration such that the reflectivity of the metal surface remains substantially unchanged by the process.

4. The process of claim 1, wherein each of the severed metal fiber fragments leaves behind on the metal surface a remaining metal fiber length ranging from 0 to about 5 micrometers that remains connected to the metal surface.

5. The process of claim 1, wherein each of the severed metal fiber fragments has a length ranging from 20 to about 500 micrometers.

6. The process of claim 1, wherein the metal fibers and metal surface are a metal selected from stainless steel, aluminum, and an aluminum alloy.

7. The process of claim 1, wherein the treating electrochemically of the metal surface with externally supplied power is carried out for a time period ranging from about 0.25 minute to about 5 minutes.

8. The process of claim 1, wherein the treating electrochemically of the metal surface with externally supplied power is carried out for a time period ranging from about 0.5 minute to about 3 minutes.

9. The process of claim 1, wherein the treating electrochemically of the metal surface with externally supplied power is carried out at a temperature ranging from about 18 to about 35 degrees C.

10. A process comprising:
    (a) creating an electrolytic cell comprised of a metal surface as a first electrode, a second electrode, and an electrolytic solution, wherein the metal surface has a plurality of metal fibers connected to the metal surface; and
    (b) treating electrochemically the metal surface with externally supplied power to the electrolytic cell to sever a number of the metal fibers from the metal surface to result in severed metal fiber fragments unconnected with the metal surface, wherein the treating electrochemically of the metal surface with externally supplied power is carried out for a time period ranging from about 0.25 minute to about 5 minutes.

11. The process of claim 10, wherein the metal fibers are severed from the metal surface at a point ranging from the metal surface to about halfway up the length of the metal fibers.

12. The process of claim 10, wherein the electrolytic solution comprises a diffusion layer thickening agent that is present in a concentration such that the reflectivity of the metal surface remains substantially unchanged by the process.

13. The process of claim 10, wherein each of the severed metal fiber fragments leaves behind on the metal surface a remaining metal fiber length ranging from 0 to about 5 micrometers that remains connected to the metal surface.

14. The process of claim 10, wherein each of the severed metal fiber fragments has a length ranging from 20 to about 500 micrometers.

15. The process of claim 10, wherein the metal fibers and metal surface are a metal selected from stainless steel, aluminum, and an aluminum alloy.

16. The process of claim 10, wherein the treating electrochemically of the metal surface with externally supplied power is carried out for a time period ranging from about 0.5 minute to about 3 minutes.

17. The process of claim 10, wherein the treating electrochemically of the metal surface with externally supplied power is carried out at a temperature ranging from about 18 to about 35 degrees C.

* * * * *